United States Patent [19]

Stafford

[11] 3,836,313
[45] Sept. 17, 1974

[54] FLAT FILM EXTRUSION DIE

[75] Inventor: Larry O. Stafford, Beloit, Wis.

[73] Assignee: Beloit Corporation, Beloit, Wis.

[22] Filed: Apr. 23, 1973

[21] Appl. No.: 353,908

[52] U.S. Cl.................. 425/463, 425/379, 425/466
[51] Int. Cl.............................................. B29f 3/04
[58] Field of Search ........... 425/376, 378, 379, 461, 425/462, 463, 464, 465, 466, 467

[56] References Cited
UNITED STATES PATENTS

| | | | |
|---|---|---|---|
| 3,151,356 | 10/1964 | Senecal........................... | 425/462 X |
| 3,360,823 | 1/1968 | Tyrner................................. | 425/466 |
| 3,611,492 | 10/1971 | Scheibling....................... | 425/462 X |
| 3,694,132 | 9/1972 | Bunte et al. ........................ | 425/466 |

*Primary Examiner*—R. Spencer Annear
*Assistant Examiner*—Mark Rosenbaum
*Attorney, Agent, or Firm*—Hill, Gross, Simpson, Van Santen, Steadman, Chiara & Simpson

[57] ABSTRACT

Flat film plastic extrusion die, which may be in the form of either a single slot or dual slot die. A body part forms the top of the die and has sloping side walls converging from their upper towards their lower ends. The body part may be in two parts divided by a divider where the die is a dual slot die. Die heaters form the closures for the melt chamber of the die and clamp thin metal liner sheets to the sloping sides of the body part by through bolts clamping the die heaters to the body. The sheets form the liner wall of the melt chamber and are sufficiently thin that pressure in the die chamber will conform the sheets into intimate contact with the inner walls of the heaters. The lower ends of the sheets depend into recessed portions of the heaters and form die lips. The die lips may be formed by the depending sheets or may extend along relatively thick silver soldered strips to define deckle lands at the lower ends of the sheets. Adjustment screws threaded in the die heaters are provided to adjust the space between the lands, or between the lands and a center divider where the die is a dual slot die.

13 Claims, 2 Drawing Figures

PATENTED SEP 17 1974   3,836,313

FLAT FILM EXTRUSION DIE

FIELD OF THE INVENTION

An inexpensive extruder die for plastic film in which heaters define side walls of the body of the die.

PRIOR ART, BACKGROUND, SUMMARY AND OBJECTS OF INVENTION

The U.S. Pat. No. 2,367,451 to West discloses an extrusion die having a converging chamber in which die heaters can be moved toward and from the die nozzle, to control the temperature of the die nozzle. The U.S. Pat. No. 3,074,106 to Eberman illustrates a two-piece die with internal means for heating the die, while the U.S. Pat. No. 2,053,920 to Schade et al illustrates a die in which members 17 and 18, said in the specification to be elastic sheet members, extend for the length of the nozzle and are fastened in place at their upper ends as by welding. The sheets are adjusted by adjustment screws to form an adjustable slit in front of the principal extrusion slit 14.

Such extrusion dies, however, are of a complicated and expensive construction and require the skill of a die maker to make the die and to the best of applicant's knowledge, have not had a marked acceptance from a commerical standpoint. Where elastic members line the hopper or nozzle of the die, the liners are separate from the die heaters and tend to add to the cost of the die rather than result in a reduction of the cost and increase in efficiency of the die.

The present invention has been devised to cure the disadvantages of the foregoing prior art references, and provide a die in which the heaters for the plastic melt chamber form the body of the die and sheet metal membranes thin enough to have intimate contact with the heaters by the pressure of the plastic melt thereon not only conform to the walls of the melt chamber, but may also form the die slot and be adjustable to govern the width of the die slot to provide accurate control of the thickness of the plastic material extruded through the slot.

The advantages of the die of the present invention are that it may be made in a machine shop rather than a tool and die shop by the simple expedient of using the die heaters as structural members of the die, and lining the heaters with polished metal sheets to form the sides and lips of the die.

A further advantage of the invention is a material reduction in heat-up time for the die attained by the use of thin section sheet metal as liners for the die, and maintained in intimate contact with the die heaters by the pressure of plastic melt thereon.

A further advantage of the die of the present invention is that its structure materially reduces the die in size and allows the die to be brought close to a chill roll.

A further advantage of the invention is that the die may either be a single slot or dual slot die and utilize the same principles in construction in each form of die.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF PREFERRED EMBODIMENTS OF INVENTION

Figure 1:
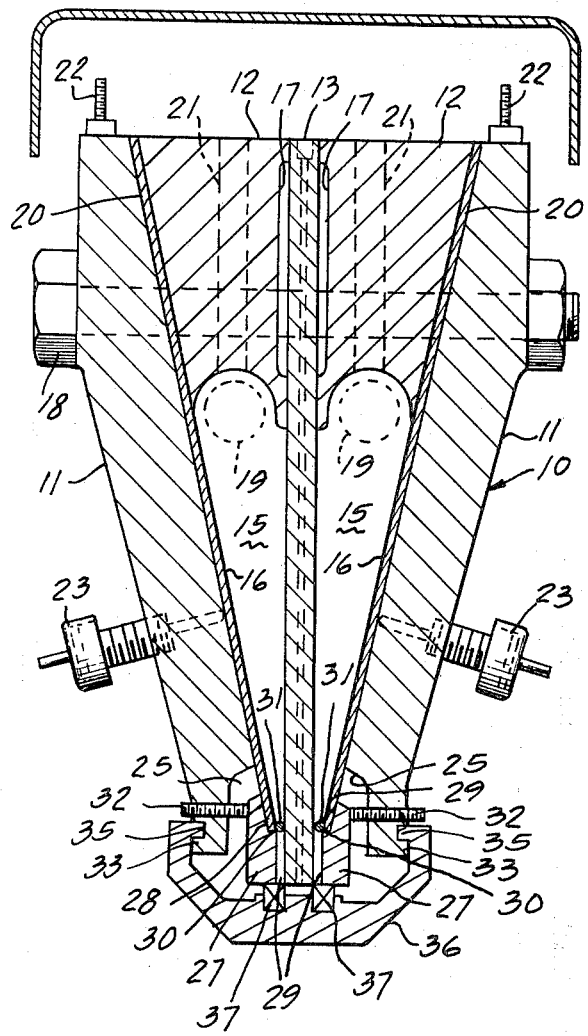
FIG. 1 is a transverse sectional view of a dual slot die constructed in accordance with the principles of the present invention.

In FIG. 1 of the drawings, I have shown a multi-melt chamber die 10 including two die heaters 11 assembled to form a generally V-shaped die. Two spacer blocks 12 cooperate with the die heaters 11 to form the body of the die and are spaced apart by a center divider 13 extending beneath said spacer blocks and defining the inner walls of two plastic melt chambers 15 of the die. The outer side walls of the melt chambers are defined by thin metal polished sheets 16, extending along the inner walls of the die heaters 11. The spacer blocks 12 are relieved along their sides abutting the divider 13, as indicated by reference numeral 17, to provide a higher unit pressure for the seal against the center divider 13. Bolts 18 extend through the die heaters 11, liner sheets 16, spacer blocks 12 and center divider 13 and have nuts threaded thereon to retain the die heaters to the spacer blocks 12 and clamp the thin liner sheets 16 to converging faces 20 of the spacer blocks 12, and thereby assemble the die to the form generally shown in section in FIG. 1. End plates (not shown) of a conventional form are secured to the ends of the die heaters and are suitably sealed thereto. The end plates may be of any suitable construction and form no part of the present invention, except insofar as they close the ends of the melt chambers, so need not herein be shown or described further.

The body parts 12 are shown as having top opening inlets 21 leading thereinto and opening to the multi-melt chambers 15 through the bottoms of the body blocks 12. While the die is herein shown in FIG. 1 as being a top feed die, it may either be a top or end feed die and hot melt plastic may be fed through the end blocks of the die. The alternate principle of end feeding is illustrated by dotted lines designated by reference numerals 19 in FIG. 1. Where end feeding is used to feed the melt chambers, it may be under the control of laminar flow control inlet blocks (not shown), which may be similar to those shown in my U.S. Pat. No. 3,583,032, dated June 8, 1971 so not described further herein.

The die heaters 11 may be conventional resistor heaters in which the resistor elements are enclosed in metal blocks, as commonly used to heat the melt chambers of extrusion dies, and maintain the temperature of the melt chambers at the required uniform temperatures. A terminal 22 is at the upper end of each die heater. Other terminals (not shown) which may form the ground terminals, may be spaced along the die heaters. The temperature of the die heaters may be controlled by conventional thermocouples 23, which are no part of the present invention so need not herein be shown or described further.

Referring now in particular to the melt chambers 15 formed by the thin metal sheets 16 extending along the inner faces of the die heaters, said sheets may be made from a thin metal such as stainless steel or a like material and have highly polished inner faces forming the side faces of the melt chambers 15. The sheets may be thin enough to readily conform to the inner faces of the heaters 11, but should have sufficient body to form die lips where desired. A suitable thickness has been found to be in the order of 0.062 inches. The thickness, of course, may vary but the sheets should be thin enough to be maintained in intimate contact with the walls of the die heaters 11 by the pressure of the plastic melt in the melt chambers 15.

As shown in FIG. 1, the lower end portions of the die heaters have outwardly stepped recesses 25 therein facing each other and opening toward the bottom of the die to provide space for the portions of the liner sheets 16 extending into said recesses, and for elongated lips 27 extending along the liner sheets 16. The lips 27 are shown as having shouldered recesses 28 backing up the free lower end portions of the liner sheets and may be welded or otherwise secured to said liner sheets. The lips 27 may be coated with silver solder, at least along their faces facing the center divider 13, to define die slots 29 leading along opposite sides of said center divider. The lips 27 may also form lands 30 for internal deckles 31 which may be in the form of wires or rods to be adjustably movable along the lands of the die lips, to aid in defining the edge of the strip and prevent edge beading thereof. The internal deckles 31 may be of any conventional form commonly used in plastic extrusion dies so are not herein shown or described further. Adjustment means are provided for adjustably moving the die lips 27 relative to the center divider 13 to define the die slots. The adjustment means are herein shown as being in the form of push screws 32 threaded in the die heaters 11 adjacent the lower end portions thereof and extending into the recesses 25 to have engagement with the outer faces of the die lips 27. The push screws 32 are adapted to press the die lips toward the center divider 13 or to relieve pressure on said die lips and accommodate said lips to follow said push screws by the resiliency of the depending portions of the sheet metal liner 16 and by the pressure of hot melt plastic thereon as extruded through the die slots 29.

The outer lower end portions of the die heaters extending beneath the push screws 32 are shown as having outer generally vertical faces 33 having outwardly opening slots 35 therein for receiving inwardly extending gibs of deckle boats 36. The deckle boats 36 are at each end of the die and are of a generally boat-like form and carry deckle seals 37 which extend along the bottom wall thereof and projecting upwardly therefrom into engagement with the bottoms of the die lips 27 and center divider 13 to seal off the opposite ends of the die slots 29, and thereby determine the width of the film. The deckle boats may be manually adjusted by screw or rack and pinion means (not shown) or any other suitable means and are no part of the present invention so are not herein shown or described.

Figure 2:
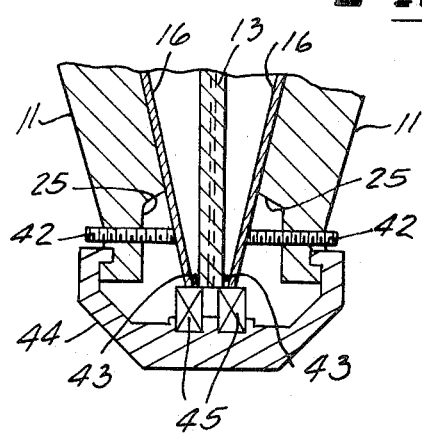
FIG. 2 is a fragmentary transverse sectional view of the lower part of the die, illustrating the use of the thin metal sheets as adjustable die lips.

In FIG. 2 of the drawings, I have shown a simplified arrangement of die lips in which the die lips extend into the recessed portions 25 and form the lips of the die. In this form of the invention, push screws 42 are threaded in the portions of the die heaters 11 forming the recesses 25 and have abutting engagement with the liner sheets to adjustably move said liner sheets toward the center divider 13 or to accommodate the pressure of the hot melt plastic on said center dividers to force said liner sheets against the adjustment screws 42 and widen the die slots, where desired or required.

Deckle wires 43 may be provided to reduce edge beading of the plastic film and determine the width thereof, while a deckle boat 44 like the deckle boat 36 is slidably guided and supported in the lower end portions of the die heaters for adjustable movement therealong as in the form of the invention illustrated in FIG. 1. The deckle boat has the usual deckle seals 45 determining the width of the film. With this arrangement, since the relatively thick die lips have been dispensed with, the die slots have a tendency to be more pliable than the die slots 29, defined by the die lips 27, and reduce the back pressure in the die at some expense of accuracy in the sheet thickness.

Where it is desired the die be a single slot rather than a double slot die, the center divider 13 may be dispensed with and the two body parts 12 may be bolted into engagement with each other or a single body part may be substituted for the two body parts shown. The die, therefore, may readily be converted from a dual slot to a single slot die and vice versa with no material alteration of the parts by merely assembling the die heaters to extend along and depend from opposite sides of a single body part or two abutting body parts, with no changes in the principles of the present invention.

I claim as my invention:
1. In an extrusion die,
elongated body means having oppositely inclined side walls converging toward the center of said body means at the same angles for forming the upper portion of said die,
a pair of die heaters abutting and extending beyond said side walls of said body means in the direction of convergence and having thin sheet metal liners extending along the inner faces thereof which define the internal faces of at least one plastic melt chamber, and sufficiently thin to flex into intimate contact with said die heaters by the pressure of the plastic melt on said liners,
the lower end portions of said metal liners cooperating to define at least a portion of a die slot,
and means adjusting the spacing between the lower end portions of said metal liners.
2. The extrusion die of claim 1, wherein strip-like die lips extend along the outer sides of the lower end portions of said metal liners and cooperate therewith to define at least one die slot.
3. The extrusion die of claim 1, wherein the means adjusting the spacing between said die lips comprise push screws threaded in said die heaters and spaced therealong and having engagement with said strips for adjusting the positions of said strips relative to each other.
4. The extrusion die of claim 2, wherein the sheet metal liners are of a thickness in the order of 0.062 inches and the die lips are silver soldered.
5. The extrusion die of claim 1,
wherein the lower end portions of said die heaters have inwardly facing and bottom opening recesses, and
wherein the metal liners extend within said recessed portions to define at least a portion of the die slot.

6. The extrusion die of claim 5, wherein strip-like die lips extend along the outer sides of the lower end portions of said metal liners and cooperate therewith to define at least one die slot.

7. The extrusion die of claim 6, wherein the means adjusting the spacing between said die lips comprise push screws threaded in said die heaters and spaced therealong and having engagement with said strips for adjusting the positions of said strips relative to each other.

8. The extrusion die of claim 1,
wherein the body means includes a central spacer and body parts clamped to opposite sides of said spacer, and
wherein the spacer depends beneath the die heaters and cooperates with said sheet liners and spacer to define a plurality of melt chambers and dual die slots of a dual slot die.

9. The extrusion die of claim 8, wherein the strip-like die lips extend downwardly of the bottoms of said metal liners and cooperate with said metal liners and center divider to form lands for deckle wires defining the width of the sheet and preventing edge beading thereof.

10. The extrusion die of claim 9,
wherein said die heaters have facing and downwardly opening recessed portions adjacent the lower ends thereof, providing space for said die lips, and
wherein push screws are provided to adjust the spacing between said die lips and said center divider to determine the width of the die slots.

11. The extrusion die of claim 10, wherein the die lips are silver soldered and the liners are of a thickness in the order of 0.062 inches to accommodate the pressure of the plastic within the melt chamber to maintain said metal liners in intimate contact with said die heaters.

12. The extrusion die of claim 11, wherein the metal liners are clamped at their upper end portions between said die heaters and body parts by the means assembling said die heaters to said body parts and freely extending along said body parts beneath said central divider to intimately conform to the die heater by the pressure of the plastic melt thereon.

13. The extrusion die of claim 9, wherein external deckle boats are slidably mounted on said die lips for adjustable movement toward and from each other and carry deckle seals having sealing engagement with said die lips and central spacer to seal the opposite ends of the die slots and further define the width of the sheet.

* * * * *